(No Model.) E. F. LOISEAU. 2 Sheets—Sheet 1.
MACHINE FOR MIXING AND MOLDING ARTIFICIAL FUEL AND OTHER GRANULATED MATERIALS.
No. 311,341. Patented Jan. 27, 1885.

WITNESSES:
P. Sagehomme
M. Vandevelde

INVENTOR
Emile F. Loiseau (No Model.)
E. F. LOISEAU.
2 Sheets—Sheet 2.
MACHINE FOR MIXING AND MOLDING ARTIFICIAL FUEL AND OTHER GRANULATED MATERIALS.
No. 311,341.
Patented Jan. 27, 1885.
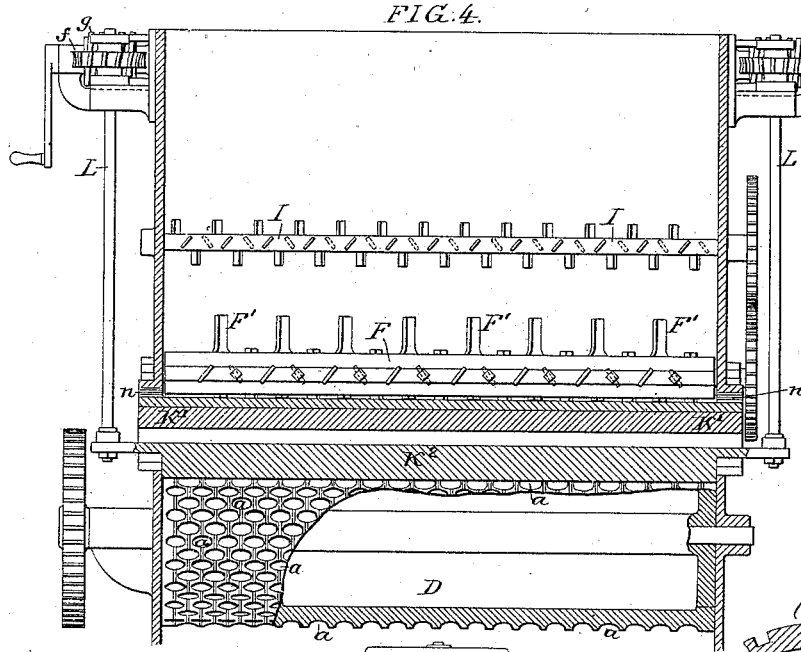
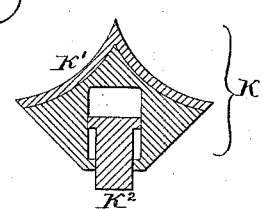
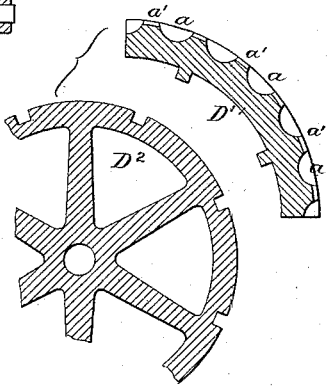
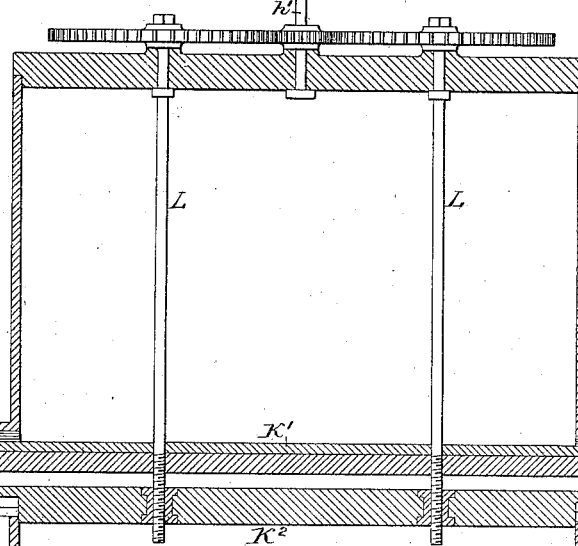
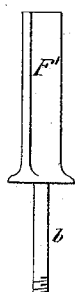
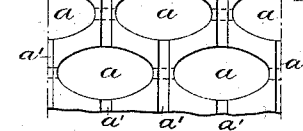
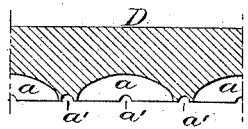
WITNESSES:
John M Clayton
Harry Drury
INVENTOR:
Emile F. Loiseau
by his attys.
Howson & Sons

UNITED STATES PATENT OFFICE.

EMILE F. LOISEAU, OF PHILADELPHIA, PENNSYLVANIA.

MACHINE FOR MIXING AND MOLDING ARTIFICIAL FUEL AND OTHER GRANULATED MATERIALS.

SPECIFICATION forming part of Letters Patent No. 311,341, dated January 27, 1885.

Application filed August 13, 1883. (No model.)

*To all whom it may concern:*

Be it known that I, EMILE F. LOISEAU, a citizen of the United States, and a resident of Philadelphia, Pennsylvania, have invented certain Improvements in Machinery or Apparatus for Molding Artificial Fuel and Other Granulated, Pulverized, and Plastic Material, of which the following is a specification.

My invention relates to that class of machines in which the pulverized or plastic material is fed to and between revolving cylinders or drums having in their surfaces pockets, which, as the cylinders rotate, coincide or register with each other to form molds for the material, the improvements being in the construction of these cylinders, and in the use in the hopper of a certain filling-block and feed-regulator, whereby the accumulation and chilling of a mass of the material above the cylinders is prevented, and the amount of material fed to said cylinders readily gaged, so as to prevent undue excess.

Figure 1:
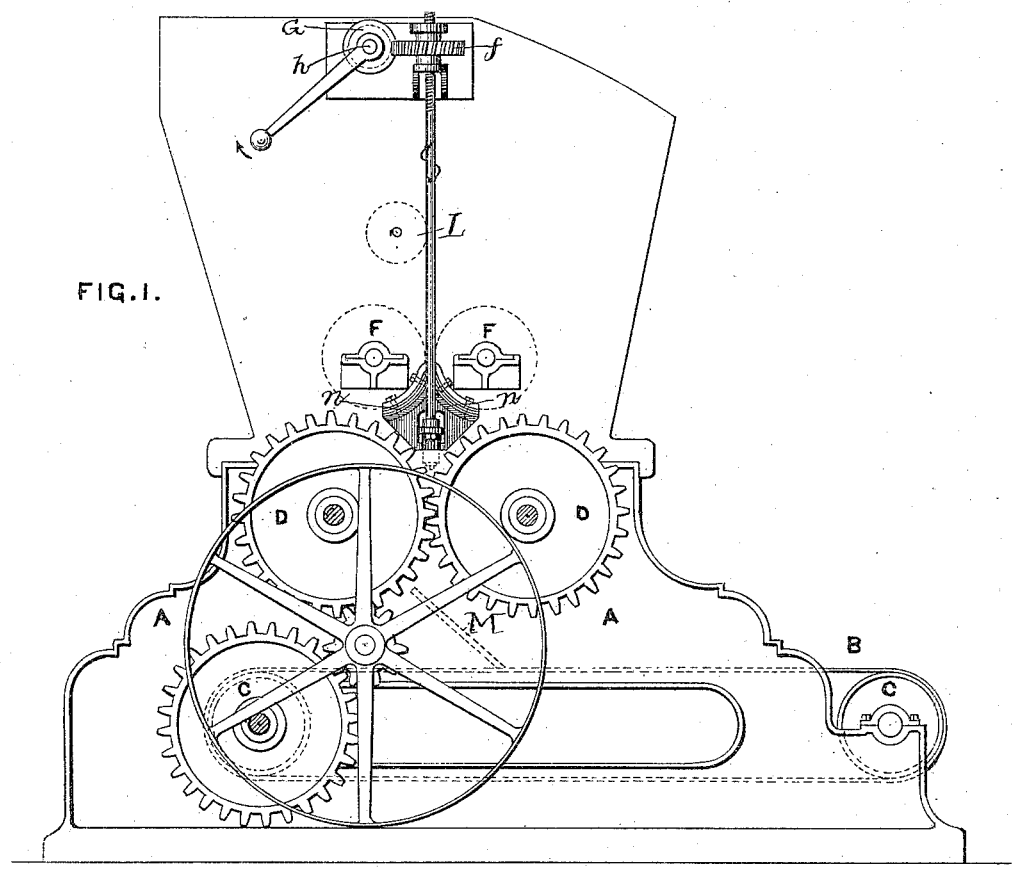
Figure 2:
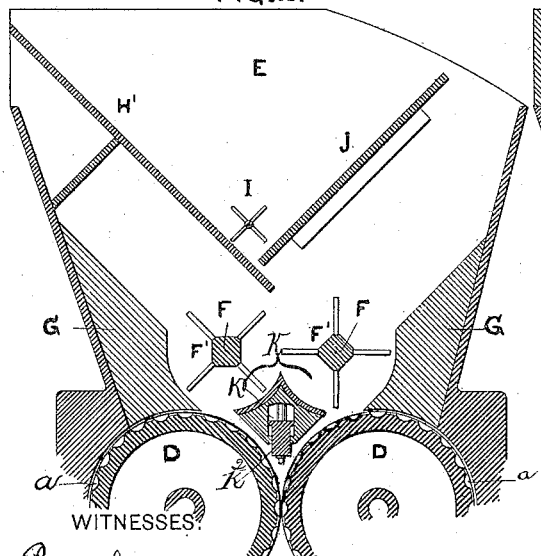
Figure 3:
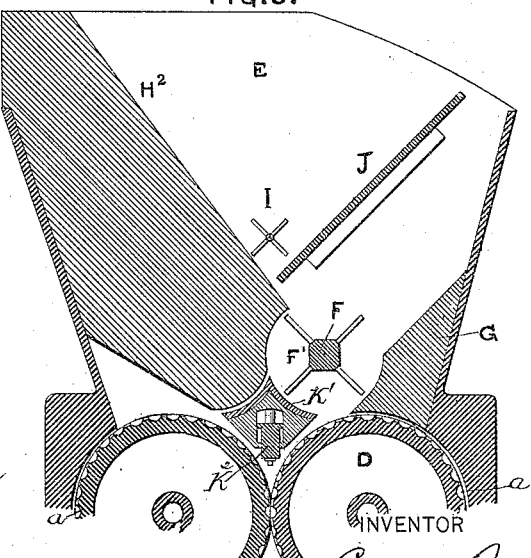

In the accompanying drawings, Figure 1, Sheet 1, is a side view of my improved molding apparatus; Fig. 2, a transverse section of the same as used for making blocks of large size; Fig. 3, a transverse section of the machine when used for making smaller blocks; Fig. 4, Sheet 2, a longitudinal section of part of the machine, showing the feed-regulator and one of the means which I employ for adjusting the same; Fig. 5, a view showing another plan of adjusting the regulator; Fig. 6, a detached view of the feed-regulator on a larger scale; Fig. 7, a section of part of the molding-cylinder; Figs. 8, 9, and 10, detached views of parts of the molding-cylinder; and Fig. 11, a detached view of one of the mixing-blades.

A represents the supporting-frame of the machine, and B an endless apron or belt, which is propelled by revolving rollers or drums C C, and is located below the molding and pressing cylinders or drums D, so as to receive and carry off the molded lumps dropped thereon. The molding-drums D may be cast in one piece; but they are preferably composed of four or more cast segments, D', Fig. 7, bolted to two or more spider-wheels, D², in the same manner as anthracite-coal breakers, so as to form a strong and rigid cylinder or drum, the segments having projections underneath fitting in recesses in the face of the spider-wheels. There are as many sets of drums or sets of segments as there are sizes of lumps to be molded. The molding-drums are of the same diameter, and they are driven by suitable gearing in connection with the driving-shaft, so that their outer surfaces run in contact with each other.

In the surfaces of the drums or of the segments D' are a series of cavities or recesses, $a$, formed preferably by milling, which register with each other as the said drums revolve, and form chambers of spherical, oval, or other form, according to the shape of the lumps in which the fuel is desired to be brought into market. Before milling out the molds, the surfaces of the drums are grooved circumferentially or longitudinally, or both, thus connecting the molds together by channels or passages $a'$, which permit the escape from one mold of surplus material into an adjoining mold, and thus prevent injury to the apparatus by the feeding into the molds of more material than they can properly compress. The molds extend in close proximity to each other in regular rows over the whole length of the drums, the molds of every other row being intermediate between the molds of the adjoining rows in the nature of the cells of a honey-comb, so that very small metallic contact-surfaces on the drums are presented, and almost the entire surface of the molding-drums is utilized for compressing the material or composition into lumps. At the ends of the intermediate rows of molds, near the outer edges of the molding-drums, are smaller cavities, $a^2$, milled out for the purpose of avoiding the contact-spaces of solid metal formed at these points, and preventing the entrance of small portions of the composition between these contact-surfaces, and any interference with the regular working of the drums. The prepared composition is received and compressed by the molds, and delivered along an inclined screening-chute, M, (see dotted lines, Fig. 1,) onto the revolving apron beneath.

In order to facilitate the delivery of the lumps from the molds the latter are made of greater width than depth, so that the thickness of the lumps is smaller than the width of the same. The hopper E has a square bottom opening about as large as the diameter of the molding-drums. The hopper is divided into two compartments. The hot and plastic composition is conveyed into the upper compartment, E, from the mixing-machine, and it falls along a chute, H, upon a horizontal shaft, I, to which are secured short paddles placed at opposite angles, as shown in Fig. 4. A movable bottom, J, sliding on guides placed inside of the hopper, rests upon the chute H. When this movable bottom is raised or lowered, the composition is delivered in larger or smaller quantity into the lower compartment of the hopper. This movable bottom determines only the level of the material in the lower part of the hopper, but it does not regulate the quantity of material to be delivered between the drums. The composition is first stirred and brought to a granulated condition in the upper compartment of the hopper by the short blades of the upper horizontal shaft, I, and when delivered into the lower compartment of the hopper it is maintained in the granulated condition by revolving stirrer-blades F', which are secured to the shafts F, the preferable plan being to furnish the blades with screw-stems $b$, which pass through the shafts, and have nuts $d$, by which they are secured. (See Fig. 11.) Underneath the revolving blades, and somewhat above the tangential point, or point of contact of the drums D, a feed-regulating device, K, is suspended. This device is composed of a stationary block, K', and a movable block, K², Fig. 4. The stationary block K' is screwed fast inside or outside of the hopper, and has for its principal object the prevention of an accumulation of material above the drums and the chilling of the said material, which would tend to interfere with a proper feed to the molding-drums. As this stationary block is fastened close to the stirring-blades, no accumulation of material is possible and the feeding-opening below is kept clear. The movable block K² of the device is guided in a recess in the stationary block K', and is moved up or down, so as to regulate the passage of the material to the drums either by the means shown in Fig. 4 or those shown in Fig. 5. In Fig. 4 the block K² is suspended by bolts L, which are threaded at the upper ends, and adapted to nuts forming part of the worm-wheels $f$, geared to worms $g$, or a shaft, $h$, having a suitable operating-crank. In Fig. 5 the bolts L are inside the hopper, and are threaded for adaptation to nuts in the block K², the bolts being rotated by spur-gearing from a hand-wheel shaft, $h'$, above the hopper. When small lumps are to be made, the bladed shaft over the back drum is removed, and an inclined block, H², Fig. 3, resting on the stationary block K' of the feed-regulator, is placed in the hopper in such a way as to muffle the back drum, and the material is then fed on the front drum, which forces the same into the molds of the muffled drum. Suitable liners $n$ $n$ are inserted between the block K' and its bearing on the hopper, so as to adjust said block to its lowest point when small lumps are to be molded. These liners are withdrawn in order to raise the feed-regulator when larger lumps are to be manufactured. The pedestals of the shafts F should also be provided with liners in order to raise or lower these shafts according to the size of the lumps to be molded. The blades F' are caused to work as close as possible to the top of the feed-regulator, in order to prevent accumulation of material at this point.

The hopper is so constructed that it can be raised bodily with all the shafting in it while a new set of drums is placed in the housings, or a new set of segments is bolted to the spider-wheels to change the size of the lumps according to the demand of the market. Blocks G, Figs. 2 and 3, occupy the spaces between the stirrer-blades and the inside of the hopper, so as to prevent accumulation of material outside and beyond the action of the stirrer-blades.

Having thus described my invention, I claim as new and desire to secure by Letters Patent—

1. The molding cylinders or drums having recesses, pockets, or cavities connected by channels $a'$, all substantially as specified.

2. The combination of the hopper, the molding-drums, and the regulator K, occupying the converging space above the two drums, as set forth.

3. The combination of the hopper, the molding-drums, the regulator K, located centrally above the drums, and the stirrer-blades F', working almost in contact with the regulator, as set forth.

4. The combination of the hopper, the molding-drums, and the regulator K, having an adjustable block, K², as set forth.

5. The combination of the hopper, the molding-drums, the stirrer-blades F', the regulator K, and the filler-blocks G, as specified.

EMILE F. LOISEAU.

Witnesses:
P. SAGEHOMME,
M. VAN NOLDE.